United States Patent Office 2,857,406
Patented Oct. 21, 1958

2,857,406
DERIVATIVES OF CORTICAL HORMONES

Hershel L. Herzog, Mountain View, N. J.

No Drawing. Application January 11, 1955
Serial No. 481,271

2 Claims. (Cl. 260—397.45)

This invention relates to oxygenated derivatives of cortical hormones and to methods and intermediates for their preparation.

I have discovered that certain oxygenated cortical hormones are valuable intermediates for the preparation of $\Delta^{1,4}$-pregnadiene-11$\beta$,17$\alpha$,21-triol-3,20-dione and $\Delta^{1,4}$-pregnadiene-17$\alpha$,21-diol-3,11,20-trione, powerful antiarthritic agents described in copending application Serial No. 464,159, filed October 22, 1954 by Arthur Nobile.

In particular, 6-bromo-4-pregnene-17$\alpha$,21-diol-3,11,20-trione 21-acetate may be converted to 4-pregnene-2,17$\alpha$,21-triol-3,11,20-trione and 6-bromo-4-pregnene-11$\beta$,17$\alpha$,21-triol-3,20-dione 11-formate-21-acetate to 4-pregnene-2,11$\beta$,17$\alpha$,21-tetrol-3,20-dione, as well as to the corresponding 2,21-diacetates in each case. These oxygenated derivatives may be converted by appropriate treatment with acids or bases to the antiarthritic compounds $\Delta^{1,4}$-pregnadiene-11$\beta$,17$\alpha$,21-triol-3,20-dione and $\Delta^{1,4}$-pregnadiene-17$\alpha$,21-diol-3,11,20-trione, thereby providing new and valuable routes for the synthesis of these desirable products. The oxygenated derivatives also possess adrenocortical properties and are consequently useful in therapy.

The compounds of this invention are prepared conveniently from the available starting materials 6-bromo-4-pregnene-17$\alpha$,21-diol-3,11,20-trione (Kendall, et al., J. Biol. Chem., 197, 261 (1952) and 6-bromo-4-pregnene-11$\beta$,17$\alpha$,21-triol-3,20-dione 11-formate 21-acetate (from the bromination according to Kendall of 4-pregnene-11$\beta$,17$\alpha$,21-triol-3,20-dione 11-formate 21-acetate) by treatment with an alkali metal salt of a lower alkanoic acid, preferably sodium acetate or potassium acetate. In this way the respective 2-alkanoates are prepared. Mild hydrolysis with aqueous or alcoholic acids or bases may be employed to convert the 2-alkanoates to the 2-hydroxysteroids.

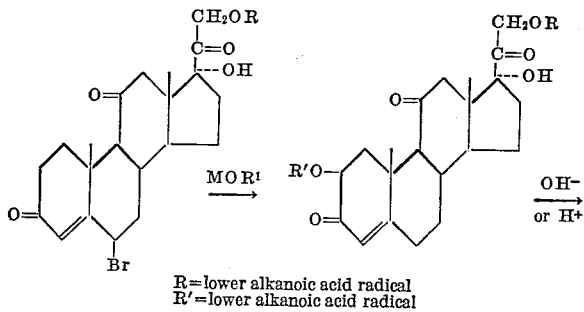

R=lower alkanoic acid radical
R'=lower alkanoic acid radical

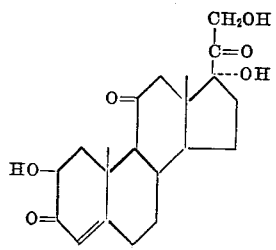

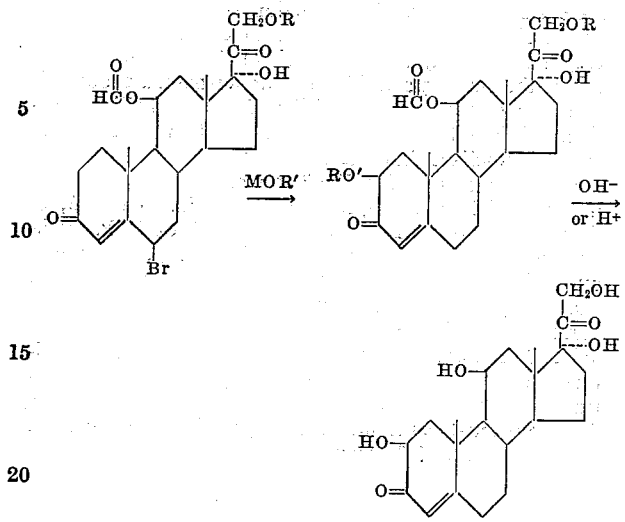

The conversion of 4-pregnene 2,17$\alpha$,21-triol-3,11,20-trione-2,21-diacetate to $\Delta^{1,4}$-pregnadiene-17$\alpha$,21-diol-3,11,20-trione 21-acetate, a powerful antiarthritic substance, by the action of hydrogen bromide in acetic acid illustrates the utility of the 2-oxygenated compounds.

Examples (1) *4-pregnene-2,17$\alpha$,21-triol-3,11,20-trione 2,21-diacetate.*—A solution of 2.0 g. of 6-bromo-4-pregnene-17$\alpha$,21-diol-3,11,20-trione 21-acetate in 100 ml. of glacial acetic acid is heated under reflux in a nitrogen atmosphere with 10 g. of anhydrous potassium acetate for four hours. The reaction mixture is then diluted with water and the products are extracted with ethyl acetate. The extracts are dried, concentrated in vacuo and the residue is taken up in a small volume of methylene chloride. The resulting solution is chromatographed on Florisil (magnesium silicate) and the solid material which is eluted with 50% ether-hexane is recrystallized several times from acetone-hexane affording 4-pregnene-2,17$\alpha$,21-triol-3,11,20-trione 2,21-diacetate, M. P. 210–215° C.

$\lambda_{max}^{alcohol}$ 238 ($\epsilon = 14,700$)

(2) *4-pregnene-2,17$\alpha$,21-triol-3,11,20-trione.*—To a refluxing solution of 1.0 g. of 4-pregnene-2,17$\alpha$,21-triol-3,11,20-trione 2,21-diacetate in 100 ml. of C. P. methanol, under a nitrogen atmosphere, is added 0.45 g. of potassium bicarbonate dissolved in 10 ml. of water. The mixture is refluxed 3–5 minutes and the pH is then adjusted to 6.8–7.0 by the addition of acetic acid. The resulting mixture is then concentrated in vacuo to a solid residue, the residue is leached thoroughly with ethyl acetate and the extracts are concentrated. The residues are then crystallized from acetone-hexane affording crystalline 4-pregnene-2,17$\alpha$,21-triol-3,11,20-trione.

(3) *6-bromo-4-pregnene-11$\beta$,17$\alpha$,21-triol-3,20-dione 11-formate 21-acetate.*—To 160 ml. of chlorobenzene is added 1.6 g. of 4-pregnene-11$\beta$,17$\alpha$,21-triol-3,20-dione 11-formate 21-acetate and the mixture is warmed until solution of the steroid is complete. Thereupon 180 ml. of dry carbon tetrachloride is added and the mixture is boiled to remove water. Then 4.2 ml. of a 10% solution of pyridine in carbon tetrachloride and 0.79 g. of N-bromsuccinimide are added, carbon dioxide is bubbled through the mixture, the mixture is illuminated by a 50-watt, frosted bulb placed in contact with the flask and the reaction is heated rapidly to boiling. After 10–20 minutes of heating the N-bromsuccinimide has reacted completely; the solution is cooled, washed with water and concentrated in vacuo. The residue may be crystallized from methylene chloride-hexane to afford crystalline 6- bromo-4-pregnene-11β,17α,21-triol-3,20-dione 11-formate 21-acetate.

(4) *4-pregnene-2,11β,17α,21-tetrol-3,20-dione 11-formate 2,21-diacetate.*—The reaction is conducted exactly as described in the first example except that 6-bromo-4-pregnene-11β,17α,21-triol-3,20-dione 11-formate 21-acetate is the starting steroid. The above-named product is chromatographed over Florisil and the crystalline fractions (50% ether-hexane and 100% ether) are pooled and recrystallized from acetone hexane.

(5) *4-pregnene-2,11β,17α,21-tetrol-3,20-dione.*—A solution of 0.5 g. of 4-pregnene-2,11β,17α,21-tetrol-3,20-dione 11-formate 2,21-diacetate in 50 ml. of C. P. methanol is treated with a solution of 0.165 g. of sodium hydroxide in 5 ml. of water under an argon atmosphere. The reaction mixture is allowed to stand at room temperature overnight and is then neutralized with acetic acid. The solution is concentrated in vacuo and the residue is extracted thoroughly with ethyl acetate. The extracts are concentrated and the residue is crystallized from acetone-hexane affording crystalline 4-pregnene-2,11β,17α,21-tetrol-3,20-dione.

I claim:
1. A compound of the group of the formula

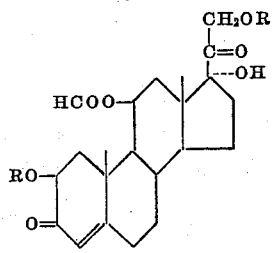

wherein R is selected from the group consisting of hydrogen and lower alkanoic acid radicals.

2. 4-pregnene-2,11β,17α,21-tetrol-3,20 - dione 11 - formate 2,21-diacetate.

References Cited in the file of this patent
UNITED STATES PATENTS
2,673,867    Spero ------------------ Mar. 30, 1954